US012164732B2

(12) United States Patent
Palmor et al.

(10) Patent No.: US 12,164,732 B2
(45) Date of Patent: Dec. 10, 2024

(54) TOUCH-SENSOR ACCURACY IN NOISY ENVIRONMENTS

(71) Applicant: Microsoft Technology Licensing, LLC, Redmond, WA (US)

(72) Inventors: Idan Palmor, Ramat Gan (IL); Lior Zagiel, Tel Aviv (IL); Yael Livne, Tel Aviv (IL); Nadav Linenberg, Even Yehuda (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/145,774

(22) Filed: Dec. 22, 2022

(65) Prior Publication Data
US 2024/0211076 A1   Jun. 27, 2024

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ......... G06F 3/044; G06F 3/0418; G06F 3/041
USPC ................................................. 345/173–174
See application file for complete search history.

(56) References Cited

U.S. PATENT DOCUMENTS

| 5,966,684 | A | 10/1999 | Richardson et al. |
| 11,481,070 | B1 | 10/2022 | Ganjali |
| 2004/0183787 | A1 | 9/2004 | Geaghan |
| 2010/0117993 | A1* | 5/2010 | Kent ..................... G06F 3/0418 345/177 |
| 2011/0115729 | A1 | 5/2011 | Kremin et al. |
| 2011/0163992 | A1* | 7/2011 | Cordeiro ............. G06F 3/04182 345/174 |

(Continued)

FOREIGN PATENT DOCUMENTS

JP 2014512606 A * 5/2014 ......... G06F 3/04166

OTHER PUBLICATIONS

International Search Report and Written Opinion received for PCT Application No. PCT/US23/036073, Feb. 8, 2024, 17 pages.

*Primary Examiner* — Kwin Xie
(74) *Attorney, Agent, or Firm* — Alleman Hall & Tuttle LLP

(57) ABSTRACT

A capacitive touch-sensor system comprises an electrode array coupled to an electromagnetic-noise source, a hardware interface, and associated output logic. The electrode array acquires sensory signal. The hardware interface exposes a touch-position output of the capacitive touch sensor. The output logic determines that an anomalous sensory electrode of the electrode array is proximate to a touchpoint, the anomalous sensory electrode providing an anomalous response to noise from the electromagnetic-noise source. Pursuant to determining that the anomalous sensory electrode is proximate to the touchpoint, the output logic identifies a non-anomalous sensory electrode of the electrode array which is usable to detect the noise. If an amplitude of the sensory signal from the non-anomalous sensory electrode exceeds a predetermined threshold, then the output logic invalidates the sensory signal for touchpoint resolution. If the sensory signal is not invalidated, the output logic computes the touch-position output based in part on the sensory signal.

20 Claims, 9 Drawing Sheets

(56) References Cited

U.S. PATENT DOCUMENTS

| | | | |
|---|---|---|---|
| 2012/0062499 A1* | 3/2012 | Weaver | G06F 3/0446 345/174 |
| 2012/0249476 A1* | 10/2012 | Schwartz | G06F 3/0418 345/174 |
| 2013/0221993 A1 | 8/2013 | Ksondzyk | |
| 2014/0152617 A1 | 6/2014 | Kida et al. | |
| 2016/0004357 A1 | 1/2016 | Westhues et al. | |
| 2020/0103993 A1 | 4/2020 | Krah et al. | |

* cited by examiner

TOUCH-SENSOR ACCURACY IN NOISY ENVIRONMENTS

BACKGROUND

A capacitive touch sensor is an input component for various kinds of electronic devices. In some devices the capacitive touch sensor comprises optically transparent material patterned above or integrated within a display panel. Common in laptop and tablet computers, smartphones, and game systems, this configuration offers combined touch-input and display functionality. Despite their utility, components that integrate capacitive touch sensing and electronic display may expose the touch sensor to electromagnetic (EM) noise from the display, which may degrade touch-sensing accuracy.

SUMMARY

One aspect of this disclosure relates to a capacitive touch-sensor system comprising an electrode array coupled to an electromagnetic-noise source, a hardware interface, and associated output logic. The electrode array is configured to acquire sensory signal. The hardware interface is configured to expose a touch-position output of the capacitive touch sensor. The output logic is configured to determine that an anomalous sensory electrode of the electrode array is proximate to a touchpoint. Here the anomalous sensory electrode is an electrode providing an anomalous response to noise from the electromagnetic-noise source. Pursuant to determining that the anomalous sensory electrode is proximate to the touchpoint, the output logic identifies a non-anomalous sensory electrode of the electrode array which is usable to detect the noise. If the amplitude of the sensory signal from a non-anomalous sensory electrode exceeds a predetermined threshold, then the output logic invalidates the sensory signal for touchpoint resolution. If the sensory signal is not invalidated, then the output logic computes the touch-position output based in part on the sensory signal.

Another aspect of this disclosure relates to a method for filtering sensory signal from a capacitive touch sensor to furnish an output. The method comprises: (a) acquiring the sensory signal from an electrode array of the capacitive touch sensor, the electrode array coupled to an electromagnetic-noise source; (b) distinguishing one or more anomalous sensory electrodes from one or more non-anomalous sensory electrodes of the electrode array, each anomalous sensory electrode providing an anomalous response to noise from the electromagnetic-noise source; (c) if an amplitude of the sensory signal at one of the non-anomalous sensory electrodes is less than a predetermined threshold when that electrode is untouched, then computing the output based in part on the sensory signal; (d) if the output does not depend on any component of the sensory signal from the one or more anomalous electrodes, then computing the output based in part on the sensory signal; and (e) exposing the output via a hardware interface of the capacitive touch sensor.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

DETAILED DESCRIPTION

Figure 1:
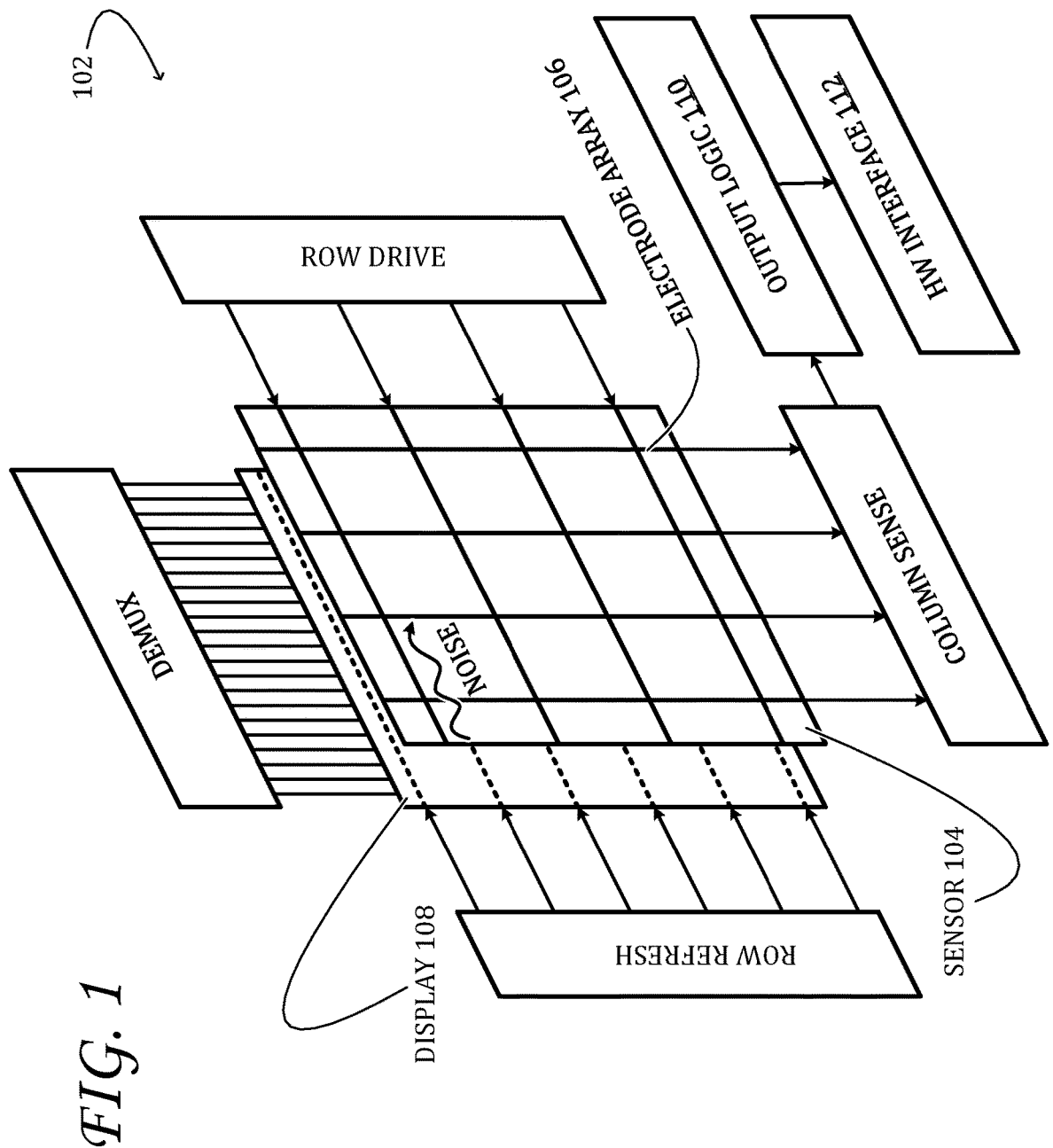
FIG. 1 shows aspects of an example capacitive touch-sensor system.

A liquid-crystal display (LCD) matrix includes many rows of thin-film transistors (TFTs), which drive corresponding rows of pixel elements. In an active-matrix organic or quantum light-emitting diode (AMOLED or QLED) display, the rows of pixel elements are driven directly. During operation of these and other display matrices, a refresh-current pulse is applied to each row in succession, to maintain or update the display content. In some touch-sensor display systems, as shown schematically in FIG. 1, electrostatic noise from the refresh-current pulse may be picked up by the sensory (e.g., column) electrodes of the touch sensor. Such noise is loosely but not strictly periodic, because the refresh-pulse rate is variable. Moreover, the internal timing of the touch sensor is generally not synchronized to that of the display. Because the electrostatic noise is modulated and propagates as a wave, such noise is recognized as an example of electromagnetic (EM) noise, a term used throughout this disclosure. FIGS. 2A and 2B provide representative plots of signal from a sensory electrode of a capacitive touch sensor coupled to a display and subject to EM noise from the refresh-current pulse. This pattern of EM noise, characterized by high-amplitude spikes, is called 'porch noise'. The term 'porch event' refers to the moment in which the electronic display completes its last frame refresh and is about to begin the new one.

The general strategy for EM-noise suppression on a capacitive touch sensor is to locate at least one untouched sensory electrode somewhat removed from the touchpoint and use that electrode as a reference—i.e., an indicator of common-mode noise, which can then be subtracted from the signal recorded at the touchpoint. The difficulty in applying that strategy to EM noise from a display is that such noise is especially sensitive to variability across the series of sensory electrodes. Variability may result from device wear, manufacturing tolerances, and/or inherent non-equivalence of the sensory electrodes (e.g., electrodes on the edge of the sensor array are necessarily anomalous). If the noise-suppression algorithm happens to select an anomalous sensory electrode as the reference, then the resulting correction will be erroneous. That may cause the touchpoint to be resolved inaccurately, in some scenarios.

This disclosure presents a series of solutions that address the issues above and provide further advantages. The solutions rely on the ability to track which of the sensory electrodes of a capacitive touch sensor are anomalous in response to EM noise from the display. That information is used for two distinct but related purposes. First, sensory signal only from non-anomalous electrodes is used as an indicator of whether the current frame sensory signal is corrupted by EM noise from a refresh pulse. Second, if the frame is indeed corrupted by EM noise from a refresh pulse, then reference signal only from non-anomalous electrodes is used to provide the correction. If no such electrode is available to support the correction, then the entire sensory frame is discarded. Discarding the sensory frame in the corner case is advantageous overall because a touchpoint resolved erroneously is more disruptive than a missing touchpoint, which may be imputed by extrapolation. In sum, the solutions herein provide the important technical effect of improving the accuracy of touchpoint resolution in configurations in which the touch sensor is prone to interference from a closely coupled EM-noise source.

Figures 2A, 2B:
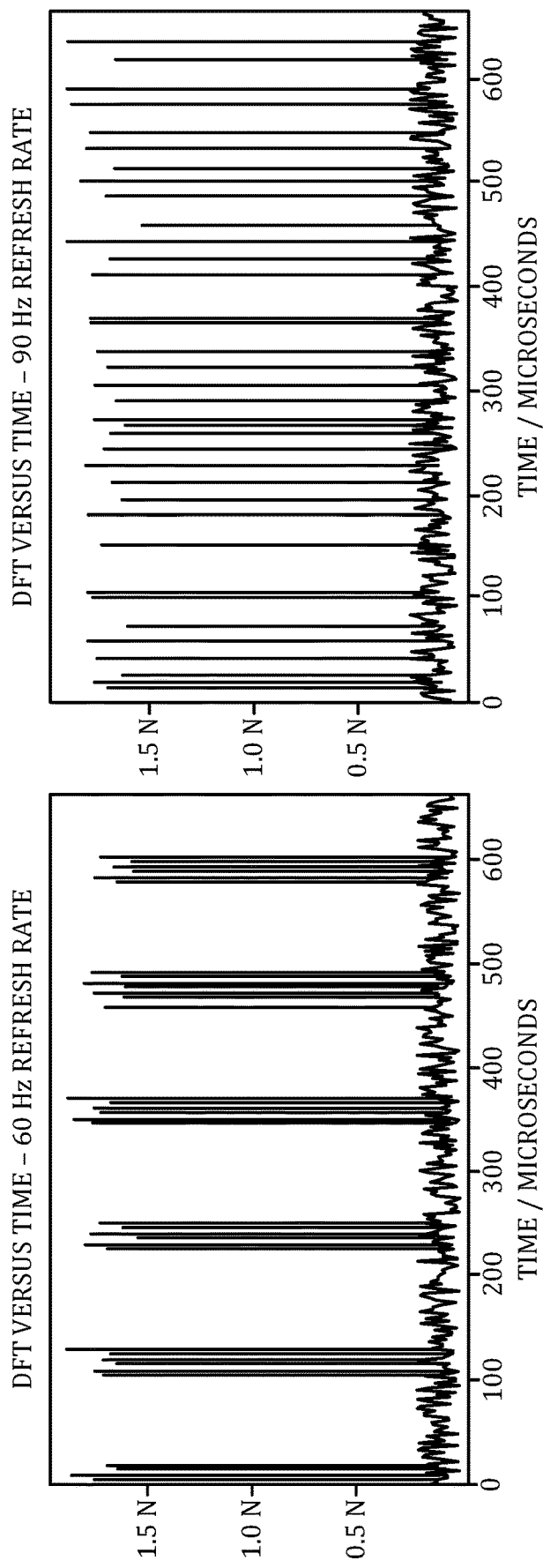
FIGS. 2A and 2B provide representative plots of EM noise as registered on a sensory electrode of a touch sensor coupled to an electronic display.

Returning now to the drawings, FIG. 1 shows aspects of an example capacitive touch-sensor system 102. The system includes a capacitive touch sensor 104 with an electrode array 106. The electrodes of the electrode array can also be called 'antennas' due to their EM transmitting/receiving function. The electrode array is configured to acquire sensory signal pursuant to touch from the user's finger or pen (vide infra). Generally speaking, the electrode array may be coupled to one or more EM-noise sources. In the illustrated example, the electrode array is closely coupled to an EM-noise source in the form of electronic display 108. The electronic display is arranged behind the electrode array of the capacitive touch sensor. For ease of illustration, the drawing shows a gap between the plane of the touch sensor and the plane of the display; in typical examples there is no gap. In some examples, the electronic display is a liquid-crystal display (LCD). In some examples the electronic display is a light-emitting diode (LED) display, such as active-matrix organic LED (AMOLED) or quantum LED (QLED) display. Display matrices of other kinds are also envisaged.

Capacitive touch sensor 104 includes output logic 110. The output logic is configured to filter the sensory signal from electrode array 106 so as to prevent invalid sensory signal from affecting the touch-position output. In a comparable system lacking the output logic, sensory signal corrupted by EM noise would be processed to yield an inaccurate touchpoint position, degrading the performance of every application or service reliant on such data. The output logic provides, accordingly, the important technical effect of improved application performance. It will be understood that the term 'touchpoint position' is used herein to refer to the position of finger touch and also the position of pen touch. In instances where it is necessary to distinguish finger touch from pen touch, that distinction should be evident from the context.

In order to filter the sensory signal, output logic 110 identifies any anomalous sensory electrode proximate to the observed or expected touchpoint. In this context, an 'anomalous' sensory electrode is a sensory electrode providing an anomalous response to EM noise, while non-anomalous sensory electrodes provide mutually comparable responses. Naturally this distinction can be refined statistically based on the routine knowledge of the skilled artisan. In some examples an anomalous response is more than one standard deviation from the mean response; in some examples, an anomalous response is more than two standard deviations from the mean response, etc. In reference to an electrode, the terms 'proximate to the touchpoint' and 'touchpoint-proximate' mean that the electrode is separated from the touchpoint by fewer than N other electrodes; N=5, 10, 20, in some examples.

Under conditions where an anomalous, touchpoint-proximate electrode is identified, the output logic also identifies at least one non-anomalous sensory electrode usable to detect noise from the EM-noise source—e.g., by virtue of being untouched at least by the hand or finger. If the amplitude of the sensory signal from a non-anomalous sensory electrode exceeds a predetermined threshold, then the output logic invalidates the frame of sensory signal for the purpose of touchpoint resolution. Under conditions where the sensory signal is not invalidated, the output logic computes the touch-position output based in part on the sensory signal.

Capacitive touch-sensor system 102 includes a hardware interface 112 configured to receive the output computed by the output logic and to expose the output to various hardware or software components of the electronic device in which the touch-sensor system is installed. Devices consonant with this disclosure include laptop and tablet computers, smartphones, and game systems. While the size, function, and form factor of the electronic device are not particularly limited, some aspects of the solutions herein are especially applicable to small, handheld devices, where the user's hand may cover a significant fraction of the sensory electrodes under some conditions.

Figure 3:
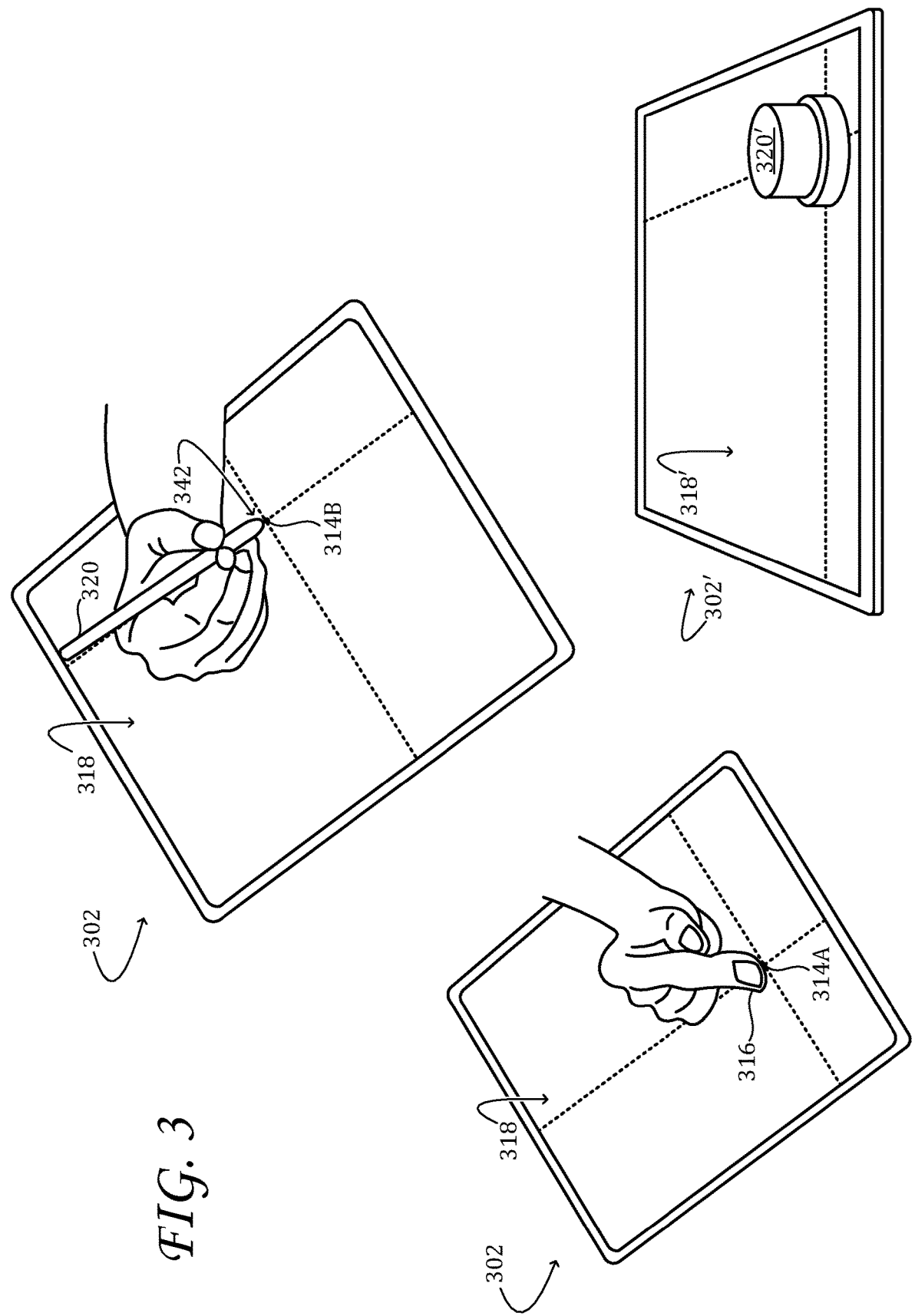
FIG. 3 shows aspects of an example capacitive touch-sensor system.

FIGS. 3 through 6 provide example, non-limiting, context for the configurations and methods herein. FIG. 3 shows aspects of an example capacitive touch-sensor system 302. The touch-sensor system is configured to sense at least one touchpoint effected by the user. Touchpoint 314A is the point of contact between the user's fingertip 316 and sensory surface 318 of the touch-sensor system; touchpoint 314B is the point of contact between the user's pen 320 and the sensory surface.

Figure 4:
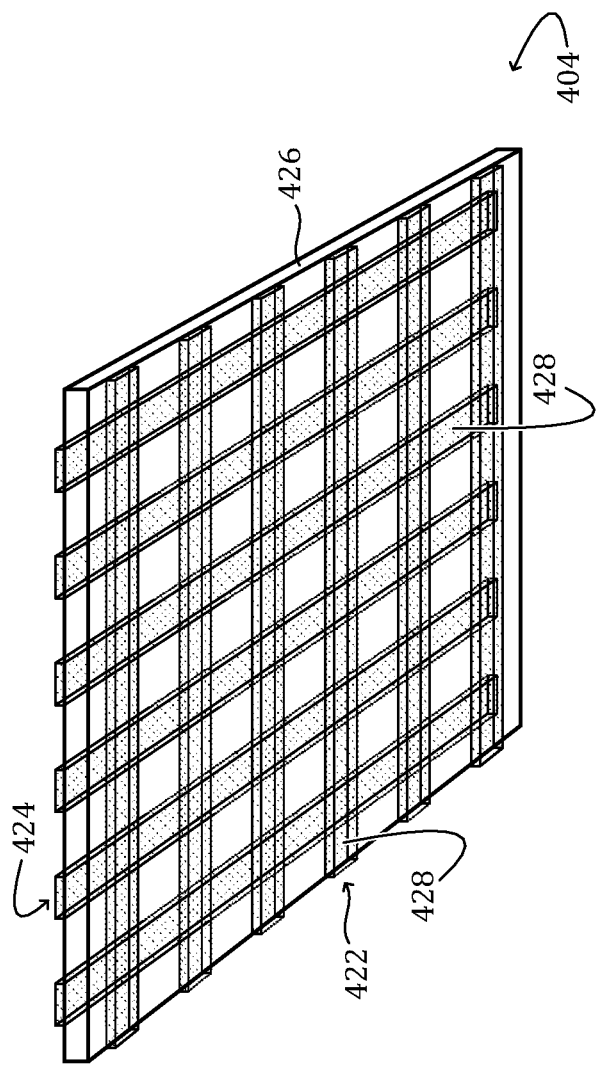
FIG. 4 shows aspects of an example capacitive touch sensor.

FIG. 4 shows aspects of an example capacitive touch sensor 404 in expanded detail. The capacitive touch sensor comprises a series of row electrodes 422 that cross a series of column electrodes 424. Touch sensors here contemplated may include any number N of row electrodes and any number M of column electrodes. Although it is customary to have the row electrodes aligned horizontally and the column electrodes aligned vertically, that aspect is in no way necessary, as the terms 'row' and 'column' may be exchanged everywhere in this description. In the illustrated example, the series of row electrodes 422 is arranged on one face of a dielectric layer 426, and the series of column electrodes 424 is arranged on the opposite face of the dielectric layer. The dielectric layer may be 50 to 100 μm in some examples, although other thickness ranges are also envisaged. The dielectric layer may comprise a polymer film, such as polyethylene terephthalate (PET). In curved, flexible and/or bendable touch-screen systems, the dielectric layer may be curved, flexible and/or bendable. Row electrodes 422 and column electrodes 424 each comprise electronically conductive material 428 distributed in the form of narrow (e.g., one mm-wide), elongate bands on the opposite faces of dielectric layer 426. Adjacent electrodes may be separated by one to five millimeters in some examples. The composition of electronically conductive material 428 is not particularly limited. The electronically conductive material may comprise a metallic microwire mesh, a metal-particle or metal-island film, or a film of a degenerately doped semiconductor, such as indium-tin oxide (ITO), for instance. Irrespective of the implementation, a capacitive touch sensor comprising row and column electrodes of relatively low resistance and high optical transmittance is desirable.

Figure 5:
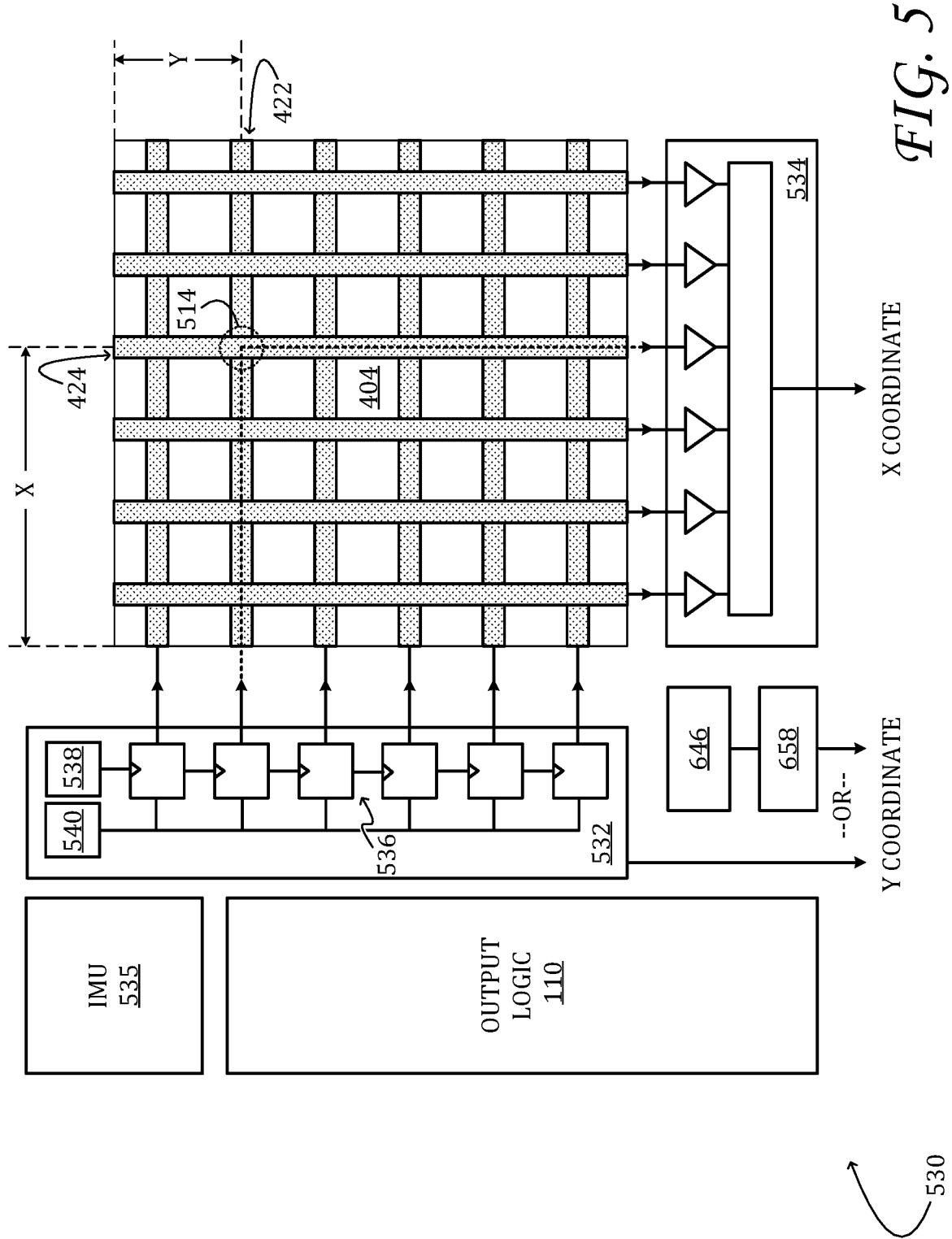
FIG. 5 shows aspects of an example capacitive touch sensor and digitizer.

Turning now to FIG. 5, row electrodes 422 and column electrodes 424 of capacitive touch sensor 404 are addressed by digitizer 530. The digitizer is configured to sense contact on or near the sensory surface of the touch-sensor system, including coordinates (X, Y) directly beneath a point of contact of a finger, pen, or other touch input on the sensory surface. To that end, the digitizer includes row-drive circuit 532 and column-sense circuit 534. The terms 'row-drive' and 'column-sense' are intuitive for configurations in which drive signal is driven through the row electrodes and sensed via the column electrodes. Based on that intuition, the terms 'column signal' and 'sensory signal' are used interchangeably throughout this disclosure. Naturally, however, the opposite configuration is also envisaged.

Column-sense circuit 534 is configured to sense a column signal from the series of column electrodes 424. In the illustrated example, the column-sense circuit includes M column amplifiers, each coupled to a corresponding column electrode. Row-drive circuit 532 includes a local row counter 536 in the form of an N-bit shift register with outputs driving each of N row electrodes 422. The local row counter is clocked by row-driver clock 538. The local row counter includes a blanking input to temporarily force all output values to zero irrespective of the values stored within the shift-register. Excitation of one or more rows may be provided by filling the local row counter with ones at every output to be excited, and zeroes elsewhere, and then toggling the blanking signal with the desired modulation from modulation clock 540. In the illustrated example, the output voltage may take on only two values, corresponding to the one or zero held in each bit of the local row counter. In other examples, the output voltage may take on a greater range of values, to reduce the harmonic content of the output waveforms or decrease radiated emissions, for instance. In some examples, row-drive circuit 532 may include one or more additional registers offset with respect to local row counter 536 and blanked by modulation clocks of different frequencies. Such variants enable concurrent excitation of two or more row electrodes (e.g., electrodes separated by a fixed number of intervening rows).

Row-drive circuit 532 of FIG. 5 applies an excitation pulse to each row electrode 422 in sequence. In this manner, the row-drive circuit is configured to concurrently drive one or more row electrodes of the series of row electrodes while leaving undriven one or more other row electrodes of the series of row electrodes. During a period in which the sensory surface is untouched, none of the column amplifiers registers an above-threshold output. However, the electrical impedance at each crossing of a row electrode 422 and a column electrode 424 is responsive to the proximity of a finger or stylus to that crossing: when the user places a fingertip on the sensory surface, the fingertip capacitively couples one or more row electrodes 422 proximate to (e.g., crossing) touchpoint 514 to one or more column electrodes 424 also proximate to the touchpoint. The capacitive coupling induces the largest signal change from the column electrode directly behind the touchpoint and smaller changes from column electrodes to either side, which tail off with increasing distance from the touchpoint.

Column-sense circuit 534 returns, as the X coordinate of the touchpoint, the numeric value of the column providing the greatest signal received. Digitizer 530 determines which row was being excited when the greatest signal was received and returns the numeric value of that row as the Y coordinate of the touchpoint. In some examples, column-sense circuit 534 may also return a Z coordinate that varies in dependence on the strength of the signal received at coordinates (X, Y). Accordingly, digitizer 530 may distinguish firm touch, associated with strong signal, from light touch, associated with weaker signal, and from hover, associated with still weaker but detectable signal. Alternatively or in addition, the digitizer may provide an output that varies according to the area of contact—e.g., the number of touched electrodes-which also may relate to the touch force. For pen detection (vide infra), the shape of the touch locus over the electrodes may be used to distinguish ink and/or hover from noise.

FIG. 5 schematically shows output logic 110 operatively coupled to digitizer 530. In some examples the output logic receives input from inertial-measurement unit (IMU) 535. The IMU may include an electronic accelerometer and gyroscope configured to provide a 6 degrees-of-freedom (DOF) determination of linear and angular acceleration of the touch-sensor system. In some examples the IMU may also include a magnetometer-based electronic compass. The IMU may be configured to provide an estimate of the orientation of the touch-sensor system to output logic 110.

Returning briefly to FIG. 3, pen 320 may be used in lieu of the user's fingertip to execute touch input on touch-sensor system 302. Accordingly, the touch sensor may be configured to sense the position of pen tip 342 relative to sensory surface 318. Like the user's fingertip, the tip of a passive pen comprises a high dielectric-constant material that capacitively couples the row and column electrodes under the touchpoint. A passive pen offers better touch accuracy than the fingertip, and may reduce smudging of the sensory surface. Although it is typical for a touch-screen input device to take the form of an elongate cylinder, that aspect is not strictly necessary. FIG. 3 shows an alternatively shaped touch-input device 320' usable on a large-format touch-sensor system 302'. It will be noted that touch-input devices of various shapes and sizes are envisaged herein and all references to a 'pen' apply equally to other touch-input devices.

Figure 6:
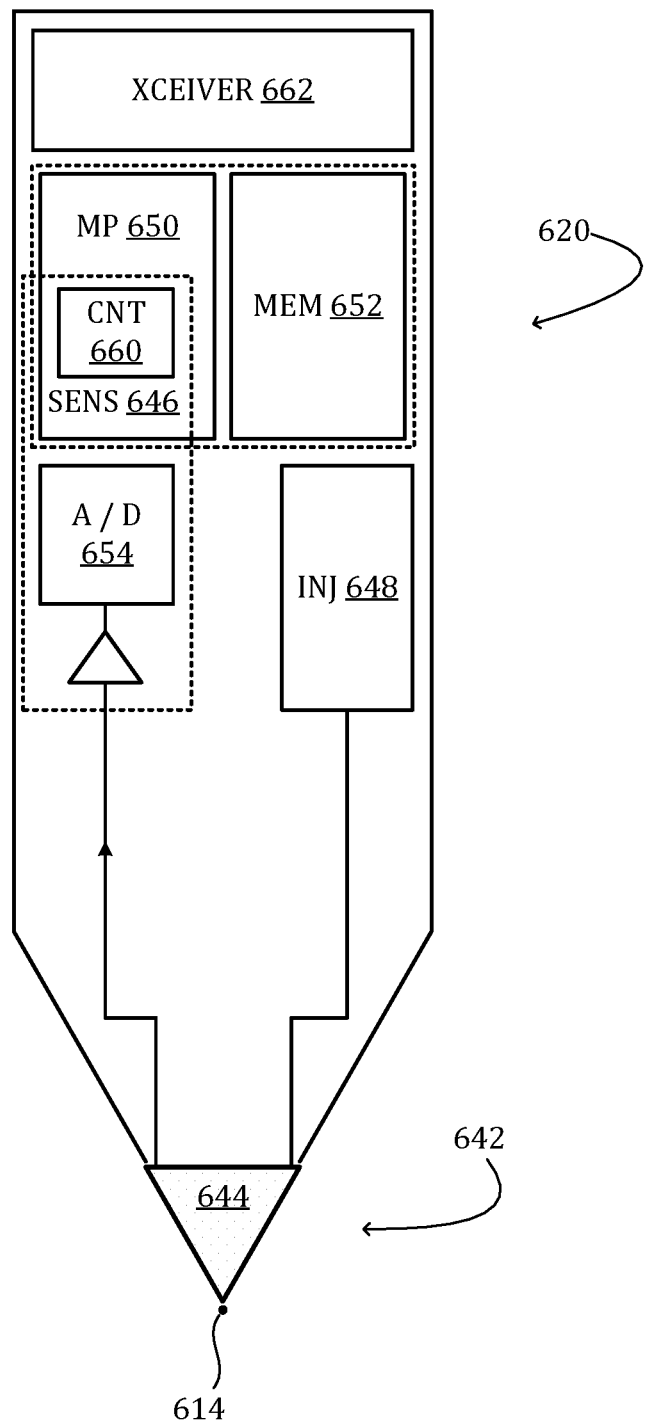
FIG. 6 shows aspects of an example pen configured to provide input to a capacitive touch sensor.

Relative to a passive pen, an active pen offers even greater touch accuracy, in addition to faster and more accurate tracking of the touchpoint. FIG. 6 shows aspects of an example active pen 620. In FIG. 6, probe electrode 644 is arranged at tip 642 of active pen 620. The probe electrode is coupled operatively to associated sensory logic 646 and injection logic 648. The sensory and injection logic are coupled to, and may be embodied partially within, microprocessor 650, which is configured for digital signal processing (DSP). The microprocessor is coupled operatively to computer memory 652. Sensory logic 646 includes linear analog componentry configured to maintain probe electrode 644 at a constant voltage and to convert any current into or out of the probe electrode into a proportional current-sense voltage. The sensory logic may include an analog-to-digital (A/D) converter 654 that converts the current-sense voltage into digital data to facilitate subsequent processing.

Instead of capacitively coupling row and column electrodes of the capacitive touch sensor via a dielectric, sensory logic 646 of active pen 620 senses the arrival of an excitation pulse from row electrode 422, behind touchpoint 614, and in response injects charge into column electrode 424, also behind the touchpoint. To that end, injection logic 648 is configured to control charge injection from the probe electrode 644 to the column electrode directly beneath the probe electrode. The injected charge appears, to column-sense circuit 534, similar to an electrostatic pulse delivered via capacitive coupling of the column electrode to an energized row electrode intersecting at the touchpoint.

In some examples, sensory logic 646 and injection logic 648 are active during non-overlapping time windows of each touch-sensing frame, so that charge injection and charge sensing may be enacted at the same probe electrode 644. In this implementation, digitizer 530 excites the series of row electrodes 422 during the time window in which the sensory logic is active, but suspends row excitation during the time window in which the pen 620 may inject charge. This strategy provides an additional advantage, in that it enables digitizer 530 to distinguish touchpoints effected by pen 620 from touchpoints effected by a fingertip or palm. If column-sense circuit 534 detects charge from a column electrode 424 during the charge-injection time window of the pen 620 (when none of the row electrodes 422 are excited), then touchpoint 614 detected must be a touchpoint of the pen. However, if the column-sense logic detects charge during the charge-sensing window of the pen (when row electrodes 422 are being excited), then the touchpoint detected may be a touchpoint of a fingertip, hand, or passive pen, for example.

In some examples row electrodes 422, which stop injecting charge during the pen-resolution window, are repurposed as sensory electrodes within that window. In configurations that support this function, each of the row drivers of row counter 536 has a three-state output including a high-impedance state, and every row electrode 422 is matched to a row-sense amplifier (not shown in the drawings but analogous to the column-sense amplifiers of column-sense circuit 534). While the row drivers are poised in the high-impedance state, the row-sense amplifiers provide sensory signal for computing the Y coordinate of the pen position, analogous to the sensory signal from the column-sense circuit from which the X coordinate is computed. Additional features of pen 620 are described further below. In still other examples and scenarios, this feature may be employed even during the window in which finger touch is resolved—i.e., undriven row electrodes can be repurposed as sensory electrodes.

Figure 7A:
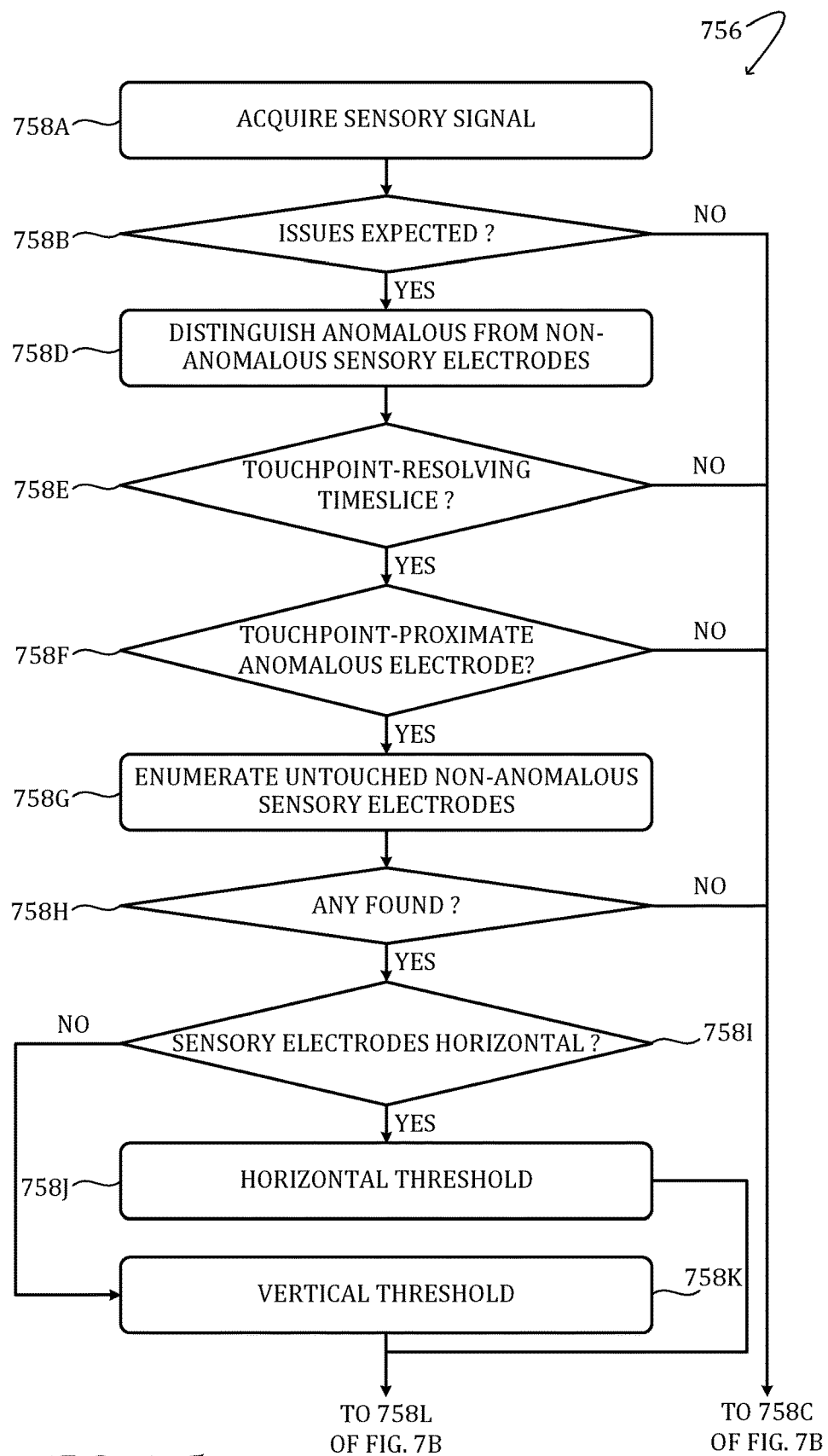
FIGS. 7A and 7B show aspects of an example method for filtering sensory signal from a capacitive touch sensor to furnish an output.
Figure 7B:
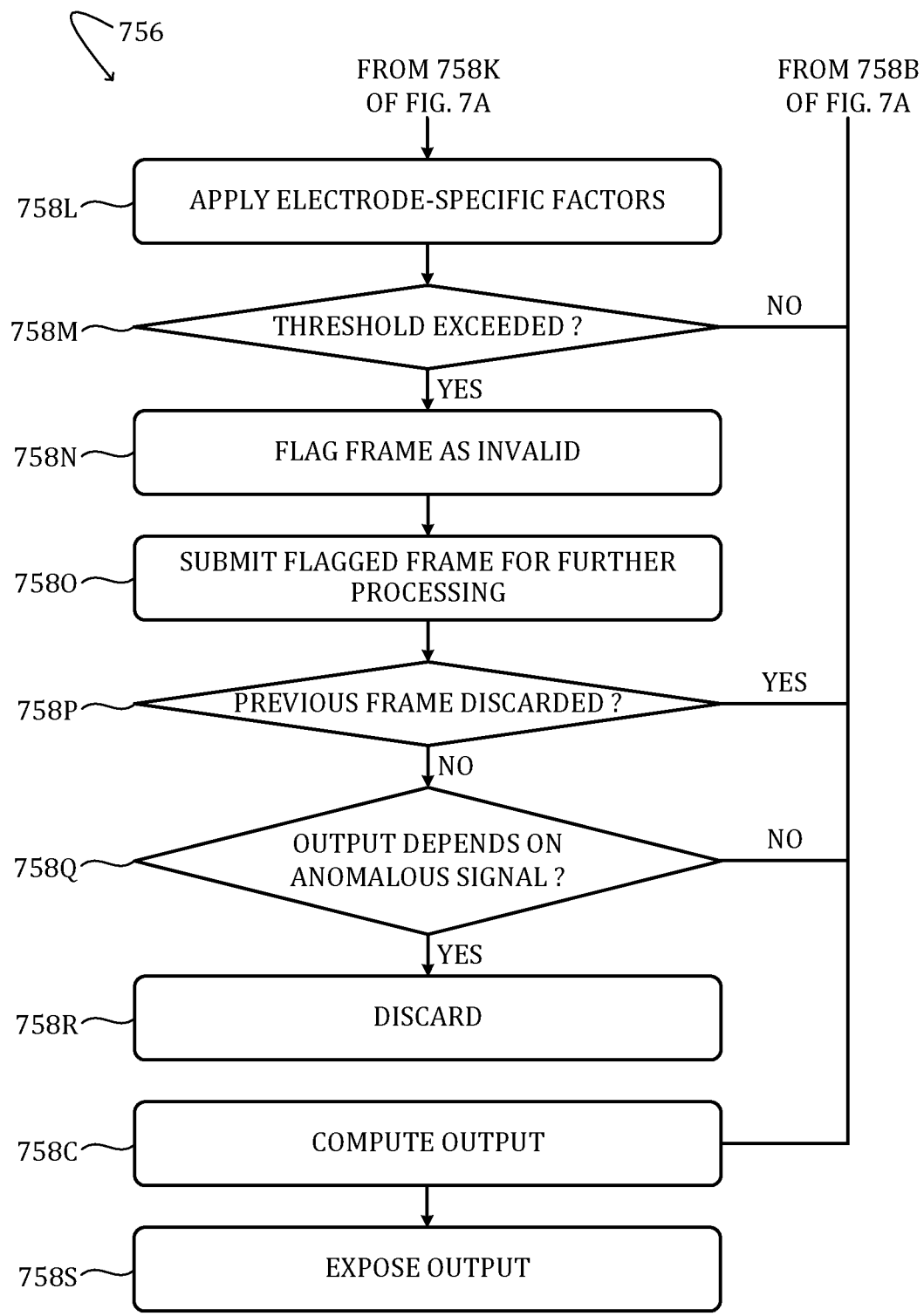

FIGS. 7A and 7B show aspects of an example method 756 for filtering sensory signal from a capacitive touch sensor to furnish an output. As noted above, the electrode array of the capacitive touch sensor is coupled to an EM-noise source, such as an electronic display.

At 758A of method 756, sensory signal is acquired from a plurality of sensory electrodes of the capacitive touch sensor. In some examples the sensory electrodes may correspond to the column electrodes of the capacitive touch sensor, such as column electrodes 424 of FIG. 5, and the sensory signal may correspond to the output of column-sense circuit 534. The term 'sensory signal' refers collectively to the set of component sensory signals from each sensory electrode. Typically the component sensory signals are analog signals initially but are converted into digital form—e.g., in digitizer 530 of FIG. 5.

At 758B output logic of the capacitive touch sensor determines whether certain noise-suppression issues are to be expected based on the configuration of the touch-sensor system. This step is useful in scenarios where a capacitive touch sensor is used in different electronic devices with similar noise-suppression protocols, and where some but not all device configurations have issues with anomalous sensory electrodes. Accordingly, this step provides the valuable technical effect of reducing computational overhead, bypassing many stages of the output logic on devices in which the signal-filtering strategy is unnecessary. In some examples the output logic may make its determination by reading a device ID from firmware or system memory. In some examples the output logic may make the determination heuristically, based on whether disruptive EM noise was encountered during previous operation of the touch-sensor system. If it is determined that the device configuration is not prone to noise-suppression issues caused by anomalous sensory electrodes, then method 756 advances to 758C. Otherwise the method continues to 758D.

At 758D the output logic distinguishes one or more anomalous sensory electrodes from one or more non-anomalous sensory electrodes of the electrode array, thereby identifying the one or more anomalous sensory electrodes. Sensory electrodes identified as anomalous may be tagged in any suitable data structure of the control logic. As noted above, each anomalous sensory electrode is a sensory electrode providing an anomalous response to noise from the EM-noise source. In some examples each of the non-anomalous sensory electrodes has a comparable (e.g., similar or substantially equal) response to the noise, but the anomalous response is greater or less than the comparable response. In some examples an anomalous response is more than one standard deviation from the mean response; in some examples, an anomalous response is more than two standard deviations from the mean response, etc.

In some examples the one or more anomalous sensory electrodes include an electrode nearest and parallel to an edge of the electrode array. Thus, a sensory electrode can be identified as anomalous based on the static configuration of the touch-sensor system. In other examples the output logic may track the sensory signals on each of the sensory electrodes during operation of the touch-sensor system. Using any suitable heuristic algorithm, the output logic may accumulate an anomaly score for each of the sensory electrodes, store the anomaly score in non-volatile memory, and subsequently retrieve and use the score to distinguish the one or more anomalous sensory electrodes.

A capacitive touch sensor may acquire sensory signal to support various functions, such as determining the position of finger or pen touch, synchronizing a pen to a digitizer, exchanging side-channel data with the pen, and so on. Generally speaking, the sensory signal related to each of the different operations is acquired over a different, timeslice during operation of the capacitive touch sensor. In some examples, the various timeslices may be arranged in a regular, repeating pattern. At 758E the output logic determines whether the sensory signal acquired at 758 was acquired within a touchpoint-resolving timeslice of the capacitive touch sensor, or, outside of every touchpoint-resolving timeslice. If the sensory signal was acquired outside of every touchpoint-resolving timeslice of the capacitive touch sensor, then method 756 advances to 758C. Otherwise the method continues to 758F. This step provides the technical effect of maintaining the operational performance of the touch-sensor system by ensuring that signal frames not used to resolve the touchpoint are never discarded.

Some noise-suppression algorithms use sensory signal from an untouched electrode a short distance from the touchpoint (i.e., reference signal) to correct the sensory signal acquired at the touchpoint. To that end, it is helpful to ensure that the reference electrode is not an anomalous electrode. At 758F the output logic determines whether any of the touchpoint-proximate sensory electrodes is anomalous. As noted above, a touchpoint-proximate electrode is separated from the touchpoint by fewer than N other electrodes, where N=5, 10, 20, etc. Typically the touchpoint-proximate electrodes are identified before the current touchpoint position is determined. For instance, the range of touchpoint-proximate electrodes may be determined with reference to the previously determined touchpoint position. This tactic makes use of the heuristic assumption that the touchpoint is unlikely to change abruptly. In other examples, a coarse estimate of the current touchpoint position may be used to determine which electrodes are touchpoint-proximate. In any event, if no anomalous sensory electrode is proximate to the touchpoint, then method 756 advances to 758C. Otherwise the method continues to 758G. This step provides the technical effect of further limiting the potentially discarded frames to those in which an anomalous electrode is actually used for resolution of the current touchpoint.

At 758G the output logic enumerates, if present, one or more untouched, non-anomalous sensory electrodes of the capacitive touch sensor. Here an attempt is made to identify at least one untouched, non-anomalous sensory electrode for the purpose of sensing noise from a refresh-current pulse or other closely coupled EM-noise source. Because such noise is potentially detectable anywhere on the electrode array, there is no need to limit the search to touchpoint-proximate electrodes. This step provides the important technical effect of improving the determination of whether or not a given frame is subject to EM noise, by ensuring that the determination is based on the response of non-anomalous electrodes only.

In most scenarios, step 758G will successfully enumerate at least one untouched, non-anomalous sensory electrode. With small, handheld devices, however, it is possible that the user's hand is lain across the entire screen, so that no sensory electrode is untouched. In that scenario, options for reliably detecting EM noise from the display and for enacting noise suppression are limited, so the most efficient tactic is to suspend the filtering method and simply process the data, understanding that the resulting touch position may be unreliable. At 758H, therefore, the output logic determines whether any untouched, non-anomalous sensory electrode can be found. If no non-anomalous sensory electrode is untouched, then method 756 advances to 758C. Otherwise the method continues to 758I.

At 758I the output logic determines, for each untouched sensory electrode, whether that electrode is a row electrode (e.g., extending horizontally) or a column electrode (e.g., extending vertically). This determination is valuable in configurations where the row and column electrodes have different dimensions or other properties—length, width, layer depth, proximity to the display, etc.— such that a different threshold is appropriate. If a given electrode extends horizontally (e.g., is a row electrode), then at 758J the output logic sets an initial threshold appropriate for an untouched row electrode. If a given sensory electrode extends vertically, then at 758K the output logic sets an initial threshold appropriate for an untouched column electrode. In this manner the predetermined threshold used to assess whether the sensory signal is corrupted by EM noise from a refresh pulse may be based in part on the orientation of the untouched sensory electrodes. At 758L the output logic modifies the initial thresholds by application of electrode-specific, numeric parameter values stored in non-volatile memory. Thus, the predetermined threshold may be further based on the parameter values. These actions provide the technical effect of improving confidence in the determination of whether the sensory signal is corrupted by EM noise from the display, by using granular thresholds that vary in dependence on the reference electrode and electrode orientation.

At 758M the output logic compares the amplitude of the sensory signal from each of the sensory electrodes to its respective, predetermined threshold. In some examples the amplitude is evaluated for comparison at a frequency orthogonal to a row-drive frequency of the capacitive touch sensor and further orthogonal to a pen frequency of the capacitive touch sensor. As used herein, frequencies $f_1$ and $f_2$ are 'orthogonal' if the Fourier components of an arbitrary signal at frequencies $f_1$ and $f_2$ have an integrated overlap of zero over a suitably broad sampling interval $T_s$. In alternative language, frequencies $f_1$ and $f_2$ are 'orthogonal' if the Fourier components of an arbitrary signal at frequencies $f_1$ and $f_2$, expressed as vectors in a suitable vector space, have a dot product of zero. At a minimum, this means that $f_1$ is not an integer multiple of $f_2$, and $f_2$ is not an integer multiple of $f_1$. With $T_s$=400 µs, for instance, frequencies of 25 kHz and 37 kHz are orthogonal, and frequencies of 25 kHz and 34 kHz are not orthogonal. Evaluating the amplitude at a frequency orthogonal to the row-drive frequency substantially immunizes the threshold comparison to noise from the touch sensor itself; evaluating at a frequency orthogonal to the pen frequency substantially immunizes the threshold comparison to noise from the pen. This provides the technical advantage of having more reliable thresholds against which to compare the reference signal and detect the 'porch' event.

If the amplitude of the sensory signal at any one of the non-anomalous sensory electrodes is less than the predetermined threshold, then method 756 advances to 758C. Otherwise the method continues to 758N, where the frame of the sensory signal is flagged as invalid, and to 758O, where the invalid frame is submitted for further processing with the attached flag. Such processing may comprise logic that executes a noise-suppression algorithm, subtracting common-mode noise from the component sensory signal recorded at the touchpoint. In some examples, the flag is an input parameter of the noise-suppression algorithm, which influences the manner in which the noise suppression is enacted.

At 758P the output logic determines whether the current invalid frame consecutively follows a previous frame that was also marked invalid or otherwise discarded. If the sensory signal consecutively follows a discarded frame of sensory signal, then method 756 advances to 758C. Otherwise the method continues to 758Q. This step provides the technical effect of preventing two consecutive frames from being discarded, which may stress the touchpoint-interpolation strategy and degrade performance of the touch-sensor system. In other examples, discarding two consecutive frames may be tolerated, but discarding N or more consecutive frames may be forbidden, where N is an integer greater than two determined based on the implementation.

In some examples and scenarios, the touchpoint-resolving algorithm uses data from all of the touchpoint-proximate sensory electrodes of the electrode array in determining the touchpoint position—e.g., the touchpoint-resolving algorithm may fit the touchpoint-proximate signal to a Gaussian and assign the touchpoint to the sensory electrode corresponding to the mean of the Gaussian. In other examples fewer sensory electrodes are used. In a scenario in which the touch-position output would not depend on sensory signal from any of the anomalous sensory electrodes, there would be no risk in moving forward with the computation even though the current sensory frame is flagged as invalid.

Accordingly, at 758Q the output logic determines whether the touchpoint position would be resolved in dependence on sensory signal from any of the one or more anomalous electrodes. This step provides the technical effect of improving performance of the touch-sensor system by avoiding unnecessary discard events. If the output does not depend on any component of the sensory signal from the one or more anomalous electrodes, then method 756 advances to 758C. Otherwise the method continues to 758Q, where the frame of sensory signal is discarded. As evident from the overall structure of method 756, a frame may be discarded under conditions where the amplitude is greater than the predetermined threshold and the sensory signal is from the one or more anomalous sensory electrodes, for instance.

At 758C the output logic computes an output, such as a touch-position output, based in part on the sensory signal. At 758S the computed output is exposed via a hardware interface of the capacitive touch sensor and thereby made available to the electronic device in which the capacitive touch sensor is installed. The output may be stored in computer memory, in a variable accessible to an operating system of the electronic device, for instance.

No aspect of the foregoing drawings or description should be interpreted in a limiting sense, because many variations, additions, and omissions are also envisaged. Although FIG. 7B shows that sensory signal disqualified due to EM noise may be discarded (at 758Q), alternative actions may be taken instead. In instances where computing the output comprises computing according to a first noise-suppression algorithm, the method may further comprise computing the output according to a distinct, second noise-suppression algorithm if the amplitude is greater than the predetermined threshold and output computation depends on sensory signal from the one or more anomalous sensory electrodes. Although the description focuses on refresh current from the display as the major source of EM noise, other EM noise sources are also contemplated and may be addressed via the methods herein.

Continuing, now, with the active-pen description, when receiving the signal from a row electrode 422, the pen 620 may inject a charge pulse with amplitude proportional to the received signal strength. Capacitive touch sensor 404 receives the electrostatic signal from pen 620 and calculates the Y coordinate, which may be the row providing the greatest signal from the pen, or a function of the signals received at that row and adjacent rows.

Active sensing followed by charge injection enables a touchpoint 614 of a very small area to be located precisely, and without requiring long integration times that would increase the latency of touch sensing. Nevertheless, this approach introduces certain challenges related to noise suppression. Various solutions—for example, code division or frequency division multiple access—may be applied to cancel the strong interference at the receiving direction from the transmitting direction. The capacitive touch sensor may be required to receive two signals simultaneously (one from the row electrode 422, and the other from probe electrode 644). Another solution is to require pen 620 to assume a more active role in determining the touchpoint coordinates. In the illustrated example, sensory logic 646 of the active pen 620 includes a remote row counter 660, which is maintained in synchronization with local row counter 536 of digitizer 530. This feature gives the pen and the touch screen a shared timing, but without being wired together.

When probe electrode 644 touches the sensory surface, sensory logic 646 receives a waveform that lasts as long as the touch is maintained. The waveform acquires maximum amplitude at the moment in time when row electrode 422, directly beneath (i.e., adjacent) the probe electrode 644, has been energized. Sensory logic 646 is configured to sample the waveform at each increment of the remote row counter 660 and determine when the maximum amplitude was sensed. This determination can be made once per frame, for example.

Because active pen 620 and digitizer 530 have shared timing due to synchronized row counters, the state of local row counter 636 at maximum sensed amplitude reports directly on the row coordinate—i.e., the Y coordinate—of touchpoint 614. In order to make use of this information, the Y coordinate must be communicated back to digitizer 530. To this end, the pen includes transceiver 662 configured to wirelessly communicate the computed row coordinate to row-sense logic of the touch screen. This disclosure embraces various modes of communicating data, including the Y coordinate, from the pen to the touch screen.

In each of the variants noted above, among others, digitizer 530 is configured to provide a pen signal responsive to the action of a pen on the associated touch sensor 404. In these examples, the pen signal comprises the analog output of column-sense circuit 534 with reference to the timing defined by sensory logic 646 of pen 620.

As noted above, the methods herein may be tied to a computer system of one or more computing devices. Such methods and processes may be implemented as an application program or service, an application programming interface (API), a library, and/or other computer-program product.

Figure 8:
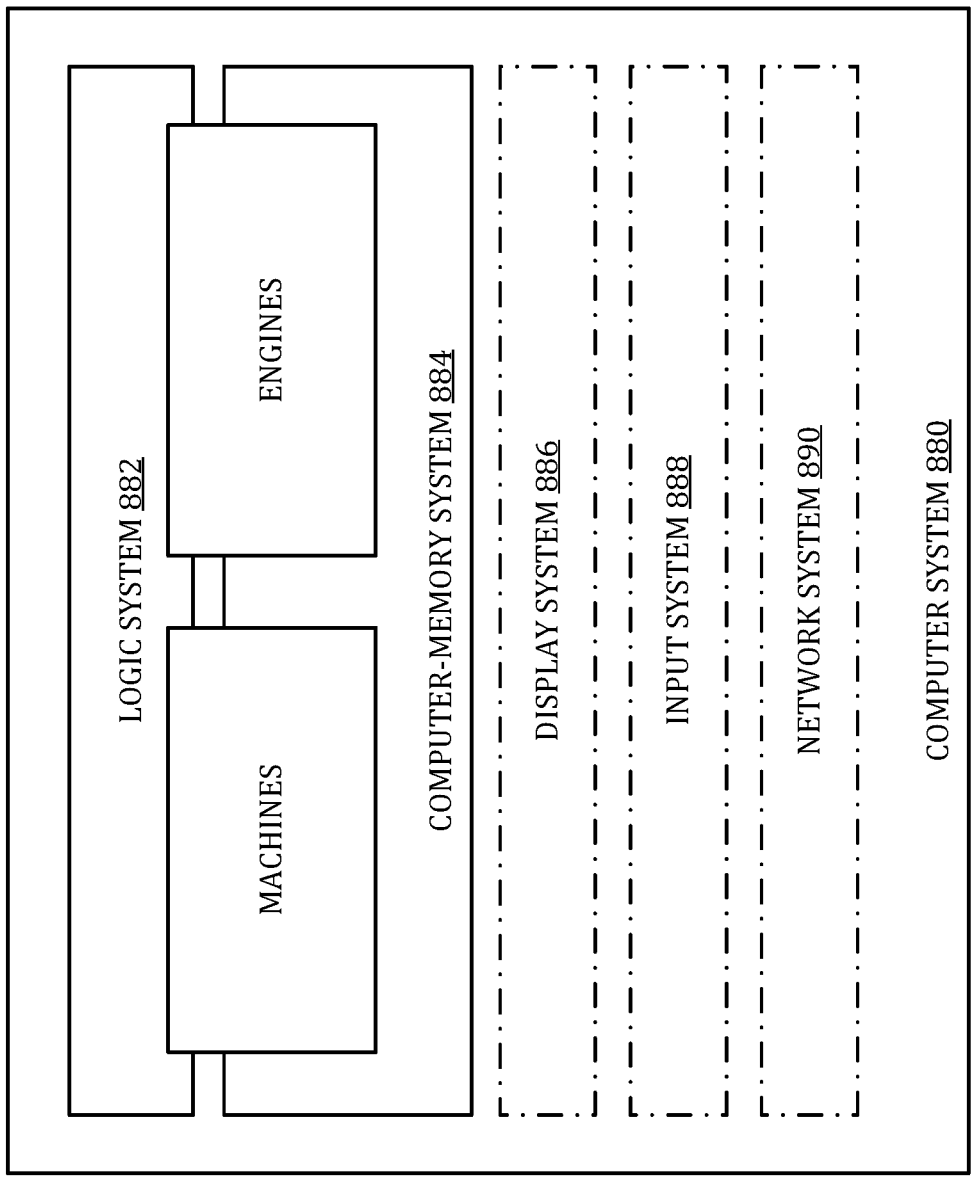
FIG. 8 provides a schematic representation of an example computer system.

FIG. 8 provides a schematic representation of a computer system 880 configured to provide some or all of the computer system functionality disclosed herein. Computer system 880 may take the form of a personal computer, application-server computer, or any other computing device.

Computer system 880 includes a logic system 882 and a computer-memory system 884. Computer system 880 may optionally include a display system 886, an input system 888, a network system 890, and/or other systems not shown in the drawings.

Logic system 882 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 884 includes at least one physical device configured to temporarily and/or permanently hold computer system information, such as data and instructions executable by logic system 882. When the computer-memory system includes two or more devices, the devices may be collocated or remotely located. Computer-memory system 884 may include at least one volatile, nonvolatile, dynamic, static, read/write, read-only, random-access, sequential-access, location-read addressable, file-read addressable, and/or content-read addressable computer-memory device. Computer-memory system 884 may include at least one removable and/or built-in computer-memory device. When the logic system executes instructions, the state of computer-memory system 884 may be transformed—e.g., to hold different data.

Aspects of logic system 882 and computer-memory system 884 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 882 and computer-memory system 884 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 886 may be used to present a visual representation of data held by computer-memory system 884. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 888 may comprise or interface with one or more input devices. An input device may include a sensor device or a user input device. Examples of user input devices include a keyboard, mouse, or touch screen.

When included, network system 890 may be configured to communicatively couple computer system 880 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to a capacitive touch-sensor system comprising an electrode array coupled to an electromagnetic-noise source, a hardware interface, and associated output logic. The electrode array is configured to acquire sensory signal. The hardware interface is configured to expose a touch-position output of the capacitive touch sensor. The output logic is configured to determine that an anomalous sensory electrode of the electrode array is proximate to a touchpoint. Here the anomalous sensory electrode is an electrode providing an anomalous response to noise from the electromagnetic-noise source. Pursuant to determining that the anomalous sensory electrode is proximate to the touchpoint, the output logic identifies a non-anomalous sensory electrode of the electrode array which is usable to detect the noise. If the amplitude of the sensory signal from a non-anomalous sensory electrode exceeds a predetermined threshold, then the output logic invalidates the sensory signal for touchpoint resolution. If the sensory signal is not invalidated, then the output logic computes the touch-position output based in part on the sensory signal.

In some implementations the system further comprises an electronic display, wherein the electromagnetic noise source includes the electronic display. In some implementations, the amplitude is evaluated at a frequency orthogonal to a row-drive frequency of the capacitive touch sensor and further orthogonal to a pen frequency of the capacitive touch sensor, and the output comprises a touchpoint position. In some implementations, determining that the anomalous sensory electrode is proximate to the touchpoint includes distinguishing one or more anomalous sensory electrodes from one or more non-anomalous sensory electrodes of the electrode array, wherein each of the non-anomalous sensory electrodes has a comparable response to the noise, and wherein the anomalous response is greater than the comparable response. In some implementations, the touchpoint is a predicted touchpoint, and the non-anomalous sensory electrode is usable by virtue of being untouched.

Another aspect of this disclosure is directed to a method for filtering sensory signal from a capacitive touch sensor to furnish an output. The method comprises: (a) acquiring the sensory signal from an electrode array of the capacitive touch sensor, the electrode array coupled to an electromagnetic-noise source; (b) distinguishing one or more anomalous sensory electrodes from one or more non-anomalous sensory electrodes of the electrode array, each anomalous sensory electrode providing an anomalous response to noise from the electromagnetic-noise source; (c) if an amplitude of the sensory signal at one of the non-anomalous sensory electrodes is less than a predetermined threshold when that electrode is untouched, then computing the output based in part on the sensory signal; (d) if the output does not depend on any component of the sensory signal from the one or more anomalous electrodes, then computing the output based in part on the sensory signal; and (e) exposing the output via a hardware interface of the capacitive touch sensor.

In some implementations, the amplitude is evaluated at a frequency orthogonal to a row-drive frequency of the capacitive touch sensor and further orthogonal to a pen frequency of the capacitive touch sensor. In some implementations, the electromagnetic-noise source comprises an electronic display. In some implementations, the one or more anomalous sensory electrodes include an electrode nearest and parallel to an edge of the electrode array. In some implementations the method further comprises computing the predetermined threshold based in part on an orientation of the untouched, non-anomalous sensory electrode. In some implementations the method further comprises computing the predetermined threshold based in part on an electrode-specific parameter value. In some implementations the method further comprises, if the sensory signal is acquired outside of a touchpoint-resolving timeslice of the capacitive touch sensor, then computing the output based in part on the sensory signal. In some implementations the method further comprises, if no anomalous sensory electrode is proximate to the touchpoint, then computing the output based in part on the sensory signal. In some implementations the method further comprises enumerating one or more untouched, non-anomalous sensory electrodes of the capacitive touch sensor. In some implementations the method further comprises, if no non-anomalous sensory electrode is untouched, then computing the output based in part on the sensory signal. In some implementations the method further comprises, if the sensory signal consecutively follows a discarded frame of sensory signal, then computing the output based in part on the sensory signal. In some implementations the method further comprises discarding the sensory signal if the amplitude exceeds the predetermined threshold and the output depends on a component of the sensory signal from the one or more anomalous sensory electrodes. In some implementations, computing the output comprises computing according to a first noise-suppression algorithm, the method further comprising computing the output according to a second noise-suppression algorithm if the amplitude exceeds the predetermined threshold and the output depends on a component of the sensory signal from the one or more anomalous sensory electrodes.

Another aspect of this disclosure is directed to a method for filtering sensory signal from a capacitive touch sensor to furnish an output. The method comprises: (a) acquiring the sensory signal from an electrode array of the capacitive touch sensor, the electrode array coupled to an electromagnetic-noise source; (b) distinguishing one or more anomalous sensory electrodes from one or more non-anomalous sensory electrodes of the electrode array, each anomalous sensory electrode providing an anomalous response to noise from the electromagnetic-noise source; (c) if the sensory signal is acquired outside of a touchpoint-resolving timeslice of the capacitive touch sensor, then computing an output based in part on the sensory signal; (d) if no anomalous sensory electrode is proximate to the touchpoint, then computing the output based in part on the sensory signal; (e) if no non-anomalous sensory electrode is untouched, then computing the output based in part on the sensory signal; (f) if an amplitude of the sensory signal at each of the non-anomalous sensory electrodes is less than a predetermined threshold when that electrode is untouched, then computing the output based in part on the sensory signal; (g) if the sensory signal consecutively follows a discarded frame of sensory signal, then computing the output based in part on the sensory signal; (h) if the output does not depend on any component of the sensory signal from the one or more anomalous electrodes, then computing the output based in part on the sensory signal; and (i) exposing the output via a hardware interface of the capacitive touch sensor.

In some implementations, each touchpoint-proximate sensory electrode is less than five electrodes removed from the touchpoint.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A capacitive touch-sensor system comprising:
   an electrode array configured to acquire sensory signal, the electrode array coupled to an electromagnetic-noise source;
   a hardware interface configured to expose a touch-position output of the capacitive touch sensor; and
   output logic configured to:
   distinguish an anomalous sensory electrode from a non-anomalous sensory electrode, the anomalous sensory electrode providing an anomalous response to noise from the electromagnetic-noise source, and the non-anomalous sensory electrode providing a non-anomalous response to noise from the electromagnetic-noise source,
   determine that the anomalous sensory electrode of the electrode array is proximate to a touchpoint,
   pursuant to determining that the anomalous sensory electrode is proximate to the touchpoint, identify the non-anomalous sensory electrode of the electrode array as usable to detect the noise,
   invalidate the sensory signal for touchpoint resolution based at least on an amplitude of the sensory signal from the non-anomalous sensory electrode exceeding a predetermined threshold, and
   compute the touch-position output based in part on the sensory signal, provided that the sensory signal is not invalidated.

2. The system of claim 1 further comprising an electronic display, wherein the electromagnetic noise source includes the electronic display.

3. The system of claim 1 wherein the amplitude is evaluated at a frequency orthogonal to a row-drive frequency of the capacitive touch sensor and further orthogonal to a pen frequency of the capacitive touch sensor, and wherein the output comprises a touchpoint position.

4. The system of claim 1 wherein determining that the anomalous sensory electrode is proximate to the touchpoint includes distinguishing one or more anomalous sensory electrodes from one or more non-anomalous sensory electrodes of the electrode array, wherein each of the non-anomalous sensory electrodes has a comparable response to the noise, and wherein the anomalous response is greater than the comparable response.

5. The system of claim 1 wherein the touchpoint is a predicted touchpoint, and wherein the non-anomalous sensory electrode is usable by virtue of being untouched.

6. A method for filtering sensory signal from a capacitive touch sensor to furnish an output, the method comprising:
acquiring the sensory signal from an electrode array of the capacitive touch sensor, the electrode array coupled to an electromagnetic-noise source;
distinguishing one or more anomalous sensory electrodes from one or more non-anomalous sensory electrodes of the electrode array, each anomalous sensory electrode providing an anomalous response to noise from the electromagnetic-noise source, each non-anomalous sensory electrode providing a non-anomalous response to noise from the electromagnetic-noise source;
computing the output based in part on the sensory signal provided that an amplitude of the sensory signal at one of the non-anomalous sensory electrodes is less than a predetermined threshold when that electrode is untouched;
computing the output based in part on the sensory signal provided that the output does not depend on any component of the sensory signal from the one or more anomalous electrodes; and
exposing the output via a hardware interface of the capacitive touch sensor.

7. The method of claim 6 wherein the amplitude is evaluated at a frequency orthogonal to a row-drive frequency of the capacitive touch sensor and further orthogonal to a pen frequency of the capacitive touch sensor.

8. The method of claim 6 wherein the electromagnetic-noise source comprises an electronic display.

9. The method of claim 6 wherein the one or more anomalous sensory electrodes include an electrode nearest and parallel to an edge of the electrode array.

10. The method of claim 6 further comprising computing the predetermined threshold based in part on an orientation of the untouched, non-anomalous sensory electrode.

11. The method of claim 6 further comprising computing the predetermined threshold based in part on an electrode-specific parameter value.

12. The method of claim 6 further comprising computing the output based in part on the sensory signal provided that the sensory signal is acquired outside of a touchpoint-resolving timeslice of the capacitive touch sensor.

13. The method of claim 6 further comprising computing the output based in part on the sensory signal provided that no anomalous sensory electrode is proximate to a touchpoint.

14. The method of claim 6 further comprising enumerating one or more untouched, non-anomalous sensory electrodes of the capacitive touch sensor.

15. The method of claim 14 further comprising computing the output based in part on the sensory signal provided that no non-anomalous sensory electrode is untouched.

16. The method of claim 6 further comprising computing the output based in part on the sensory signal provided that the sensory signal consecutively follows a discarded frame of sensory signal.

17. The method of claim 6 further comprising discarding the sensory signal based at least on the amplitude exceeding the predetermined threshold together with the output depending on a component of the sensory signal from the one or more anomalous sensory electrodes.

18. The method of claim 6 wherein computing the output comprises computing according to a first noise-suppression algorithm, the method further comprising computing the output according to a second noise-suppression algorithm based at least on the amplitude exceeding the predetermined threshold together with the output depending on a component of the sensory signal from the one or more anomalous sensory electrodes.

19. A method for filtering sensory signal from a capacitive touch sensor to furnish an output, the method comprising:
acquiring the sensory signal from an electrode array of the capacitive touch sensor, the electrode array coupled to an electromagnetic-noise source;
distinguishing one or more anomalous sensory electrodes from one or more non-anomalous sensory electrodes of the electrode array, each anomalous sensory electrode providing an anomalous response to noise from the electromagnetic-noise source, each non-anomalous sensory electrode providing a non-anomalous response to noise from the electromagnetic-noise source;
computing an output based in part on the sensory signal provided that the sensory signal is acquired outside of a touchpoint-resolving timeslice of the capacitive touch sensor;
computing the output based in part on the sensory signal provided that no anomalous sensory electrode is proximate to the touchpoint;
computing the output based in part on the sensory signal provided that no non-anomalous sensory electrode is untouched;
computing the output based in part on the sensory signal provided that an amplitude of the sensory signal at each of the non-anomalous sensory electrodes is less than a predetermined threshold when that electrode is untouched;
computing the output based in part on the sensory signal provided that the sensory signal consecutively follows a discarded frame of sensory signal;
computing the output based in part on the sensory signal provided that the output does not depend on any component of the sensory signal from the one or more anomalous electrodes; and
exposing the output via a hardware interface of the capacitive touch sensor.

20. The method of claim 19 wherein each touchpoint-proximate sensory electrode is less than five electrodes removed from the touchpoint.

* * * * *